United States Patent
Nishihara et al.

(10) Patent No.: US 8,972,902 B2
(45) Date of Patent: Mar. 3, 2015

(54) COMPOUND GESTURE RECOGNITION

(75) Inventors: H. Keith Nishihara, Los Altos, CA (US); Shi-Ping Hsu, Pasadena, CA (US); Adrian Kaehler, Boulder Creek, CO (US); Bran Ferren, Glendale, CA (US); Lars Jangaard, Glendale, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1393 days.

(21) Appl. No.: 12/196,767

(22) Filed: Aug. 22, 2008

(65) Prior Publication Data
US 2010/0050133 A1 Feb. 25, 2010

(51) Int. Cl.
*G06F 3/033* (2013.01)
*G06F 3/01* (2006.01)

(52) U.S. Cl.
CPC ...................................... *G06F 3/017* (2013.01)
USPC ........... 715/863; 715/856; 715/857; 382/103; 382/154; 382/203; 345/156; 345/157

(58) Field of Classification Search
USPC .......... 715/863, 856, 857; 382/103, 154, 203; 345/156, 157
See application file for complete search history.

(56) References Cited

U.S. PATENT DOCUMENTS

| | | |
|---|---|---|
| 4,468,694 A | 8/1984 | Edgar |
| 4,843,568 A | 6/1989 | Krueger et al. |
| 4,924,506 A | 5/1990 | Crossley et al. |
| 5,220,441 A | 6/1993 | Gerstenberger |
| 5,239,373 A | 8/1993 | Tang et al. |
| 5,475,422 A | 12/1995 | Mori et al. |
| 5,483,261 A | 1/1996 | Yasutake |
| 5,528,263 A * | 6/1996 | Platzker et al. ............... 345/156 |
| 5,563,988 A | 10/1996 | Maes et al. |
| 5,594,469 A * | 1/1997 | Freeman et al. ............. 345/158 |
| 5,913,727 A | 6/1999 | Ahdoot |
| 5,999,185 A | 12/1999 | Kato et al. |
| 6,002,808 A | 12/1999 | Freeman |
| 6,128,003 A | 10/2000 | Smith et al. |

(Continued)

FOREIGN PATENT DOCUMENTS

DE 197 39 285 C1 11/1998
EP 0 571 702 A2 12/1993

(Continued)

OTHER PUBLICATIONS

Search Report for corresponding GB 0913330.7; Completed Nov. 3, 2009 by Dr. Russell Maurice.

(Continued)

*Primary Examiner* — Weilun Lo
*Assistant Examiner* — Rashedul Hassan
(74) *Attorney, Agent, or Firm* — Tarolli, Sundheim, Covell & Tummino LLP

(57) ABSTRACT

One embodiment of the invention includes a method for executing and interpreting gesture inputs in a gesture recognition interface system. The method includes detecting and translating a first sub-gesture into a first device input that defines a given reference associated with a portion of displayed visual content. The method also includes detecting and translating a second sub-gesture into a second device input that defines an execution command for the portion of the displayed visual content to which the given reference refers.

9 Claims, 9 Drawing Sheets

(56) References Cited

U.S. PATENT DOCUMENTS

| | | | |
|---|---|---|---|
| 6,144,366 A * | 11/2000 | Numazaki et al. | 345/156 |
| 6,147,678 A | 11/2000 | Kumar et al. | |
| 6,160,899 A * | 12/2000 | Lee et al. | 382/103 |
| 6,195,104 B1 | 2/2001 | Lyons | |
| 6,204,852 B1 | 3/2001 | Kumar et al. | |
| 6,222,465 B1 * | 4/2001 | Kumar et al. | 341/20 |
| 6,327,381 B1 | 12/2001 | Rogina et al. | |
| 6,353,428 B1 | 3/2002 | Maggioni et al. | |
| 6,359,612 B1 | 3/2002 | Peter et al. | |
| 6,434,255 B1 | 8/2002 | Harakawa | |
| 6,512,507 B1 | 1/2003 | Furihata et al. | |
| 6,624,833 B1 | 9/2003 | Kumar et al. | |
| 6,681,031 B2 | 1/2004 | Cohen et al. | |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1 | 9/2004 | Dadourian | |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1 | 10/2005 | Bergen et al. | |
| 6,983,065 B1 | 1/2006 | Akgul et al. | |
| 7,030,861 B1 * | 4/2006 | Westerman et al. | 345/173 |
| 7,042,440 B2 | 5/2006 | Pryor et al. | |
| 7,129,927 B2 | 10/2006 | Mattsson | |
| 7,259,747 B2 | 8/2007 | Bell | |
| 7,643,552 B2 * | 1/2010 | Saishu et al. | 375/240.01 |
| 7,701,439 B2 | 4/2010 | Hillis et al. | |
| 2001/0006426 A1 | 7/2001 | Son et al. | |
| 2001/0043719 A1 | 11/2001 | Harakawa et al. | |
| 2001/0044858 A1 * | 11/2001 | Rekimoto | 710/1 |
| 2002/0090146 A1 | 7/2002 | Heger et al. | |
| 2002/0093666 A1 | 7/2002 | Foote et al. | |
| 2002/0122113 A1 | 9/2002 | Foote | |
| 2002/0126161 A1 | 9/2002 | Kuzunuki et al. | |
| 2002/0186221 A1 | 12/2002 | Bell | |
| 2003/0058341 A1 | 3/2003 | Brodsky et al. | |
| 2003/0067537 A1 | 4/2003 | Myers | |
| 2003/0085866 A1 | 5/2003 | Bimber | |
| 2003/0156756 A1 * | 8/2003 | Gokturk et al. | 382/190 |
| 2003/0218761 A1 | 11/2003 | Tomasi et al. | |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 | 7/2004 | Mittal et al. | |
| 2004/0183775 A1 | 9/2004 | Bell | |
| 2004/0193413 A1 | 9/2004 | Wilson et al. | |
| 2004/0239761 A1 | 12/2004 | Jin et al. | |
| 2005/0002074 A1 | 1/2005 | McPheters et al. | |
| 2005/0012817 A1 | 1/2005 | Hampapur et al. | |
| 2005/0052714 A1 | 3/2005 | Klug et al. | |
| 2005/0068537 A1 | 3/2005 | Han et al. | |
| 2005/0088714 A1 | 4/2005 | Kremen | |
| 2005/0110964 A1 | 5/2005 | Bell et al. | |
| 2005/0151850 A1 * | 7/2005 | Ahn et al. | 348/207.99 |
| 2005/0166163 A1 | 7/2005 | Chang et al. | |
| 2005/0271279 A1 * | 12/2005 | Fujimura et al. | 382/203 |
| 2005/0275628 A1 | 12/2005 | Balakrishnan et al. | |
| 2005/0285945 A1 | 12/2005 | Usui et al. | |
| 2005/0286101 A1 | 12/2005 | Garner et al. | |
| 2006/0010400 A1 | 1/2006 | Dehlin et al. | |
| 2006/0036944 A1 | 2/2006 | Wilson | |
| 2006/0052953 A1 | 3/2006 | Vilanova et al. | |
| 2006/0092178 A1 | 5/2006 | Tanguay | |
| 2006/0125799 A1 | 6/2006 | Hillis et al. | |
| 2006/0187196 A1 | 8/2006 | Underkoffler et al. | |
| 2006/0203363 A1 | 9/2006 | Levy-Rosenthal | |
| 2006/0209021 A1 * | 9/2006 | Yoo et al. | 345/156 |
| 2007/0024590 A1 | 2/2007 | Krepec | |
| 2007/0064092 A1 | 3/2007 | Sandbeg et al. | |
| 2008/0013826 A1 | 1/2008 | Hillis et al. | |
| 2008/0028325 A1 * | 1/2008 | Ferren et al. | 715/753 |
| 2008/0043106 A1 | 2/2008 | Hassapis et al. | |
| 2008/0107303 A1 * | 5/2008 | Kim et al. | 382/103 |
| 2008/0141181 A1 * | 6/2008 | Ishigaki et al. | 715/863 |
| 2008/0143975 A1 * | 6/2008 | Dennard et al. | 353/42 |
| 2008/0150913 A1 | 6/2008 | Bell et al. | |
| 2008/0244465 A1 * | 10/2008 | Kongqiao et al. | 715/863 |
| 2008/0244468 A1 | 10/2008 | Nishihara et al. | |
| 2008/0300055 A1 * | 12/2008 | Lutnick et al. | 463/39 |
| 2009/0015791 A1 | 1/2009 | Chang et al. | |
| 2009/0103780 A1 | 4/2009 | Nishihara et al. | |
| 2009/0115721 A1 | 5/2009 | Aull et al. | |
| 2009/0116742 A1 | 5/2009 | Nishihara | |
| 2009/0172606 A1 * | 7/2009 | Dunn et al. | 715/863 |
| 2009/0228841 A1 * | 9/2009 | Hildreth | 715/863 |
| 2009/0316952 A1 | 12/2009 | Ferren et al. | |

FOREIGN PATENT DOCUMENTS

| | | |
|---|---|---|
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 2008/001202 A3 | 1/2008 |

OTHER PUBLICATIONS

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-07695-1602-8, p. 2.

British Search Report for corresponding GB 0909597.7 completed Sep. 17, 2009.

British Search Report for corresponding GB0910067.8, completed Oct. 15, 2009.

DE Office Action for corresponding DE 10 2009 043 798.3, issued Nov. 10, 2010.

Dubois, et al.: "In Vivo Measurement of Surgical Gestures"; IEEE Transactions on Biochemical Engineering, vol. 49, No. 1, Jan. 2002, pp. 49-54.

EP Search Report for corresponding EP 07 25 2716, completed Jun. 4, 2010, The Hague.

EP Search Report for corresponding EP 07 25 2870 completed Aug. 16, 2010 by Suphi Umut Naci of the Hague.

European Search Report for corresponding EP 07 25 2717 completed Sep. 27, 2007 by Martin Müller of the EPO.

Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.

Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.

Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC.1993.390870, vol. -, Oct. 17, 1993, pp. 324-328, XP010132504, ISBN: 978-0-7803-0911-1, pp. 325; figures 1-4.

(56) References Cited

OTHER PUBLICATIONS

Kjeldsen, et al.: "Toward the Use of Gesture in Traditional User Interfaces"; Automatic Face and Gesture Recognition, 1996, Proceedings of the Second International Conference on Killington, VT, USA 14-1619961014 Los Alamitos, CA, USA, IEEE Comput. Soc., ISBN 978-0-8186-7713-7; whole document.

Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.

Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse"; IP.COM Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.

Plesniak, W et al.: "Spatial Interaction with Haptic Holograms"; Multimedia Computing and Systems, 1999, IEEE International Conference on Florence, Italy Jun. 7-11, 1999, Los Alamitos, CA, USA, IEEE Comput. Soc. US, vol. 1, Jun. 7, 1999, pp. 413-426, XP010342817 ISBN: 0-7695-0253-9; Abstract, Figs. 7, 8.

Rehg: "visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA3066778,Location=U28&doc=GetRDoc.pdf> [retrieved on May 25, 2010], p. 1, 28, 31.

Sato, Y et al.: "Real-Time Input of 3D Pose and Gestures of a Users Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0715481.8, Date of Search: Nov. 27, 2007.

Sonka, et al.: "Image Processing, Analysis, and Machine Vision Second Edition"; Sep. 30, 1998, Thomson, XP002585208, ISBN: 053495393X, p. v-xii, p. 82-89.

Sutcliffe, et al.: "Presence, Memory and Interaction in Virtual Environments"; International Journal of Human-Computer Studies, 62 (2005), pp. 307-327.

Vamossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.

German Office Action for corresponding DE 10 2009 034 413.6-53, issued Sep. 29, 2010.

* cited by examiner

US 8,972,902 B2

COMPOUND GESTURE RECOGNITION

TECHNICAL FIELD

The present invention relates generally to interface systems, and specifically to compound gesture recognition.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

SUMMARY

One embodiment of the invention includes a method for executing and interpreting gesture inputs in a gesture recognition interface system. The method includes detecting and translating a first sub-gesture into a first device input that defines a given reference associated with a portion of displayed visual content. The method also includes detecting and translating a second sub-gesture into a second device input that defines an execution command for the portion of the displayed visual content to which the given reference refers.

Another embodiment of the invention includes a method for executing and interpreting gesture inputs in a gesture recognition interface system. The method includes obtaining a plurality of sequential images of a gesture input environment and detecting a first sub-gesture based on a three-dimensional location of at least one feature of a first input object relative to displayed visual content in each of the plurality of sequential images of the gesture input environment. The method also includes translating the first sub-gesture into a first device input that defines a given reference associated with a portion of the displayed visual content. The method also includes detecting a second sub-gesture based on changes in the three-dimensional location of at least one feature of at least one of the first input object and a second input object in each of the plurality of sequential images of the gesture input environment. The method further includes translating the second sub-gesture into a second device input that defines an execution command for the portion of the displayed visual content to which the given reference refers.

Another embodiment of the invention includes a gesture recognition system. The system comprises means for displaying visual content and means for obtaining a plurality of sequential images of a gesture input environment that is associated with the visual content. The system also comprises means for determining compound gesture inputs associated with at least one input object based on three-dimensional locations of at least one feature of the at least one input object in each of the plurality of sequential images of the gesture input environment. The system further comprises means for translating the compound gesture inputs into a first device input and a second device input. The first device input can be configured to reference a portion of the visual content and the second device input can be configured to execute a command associated with the portion of the visual content to which the first device input refers in at least one of the buffered plurality of sequential images.

DETAILED DESCRIPTION

Figure 1:
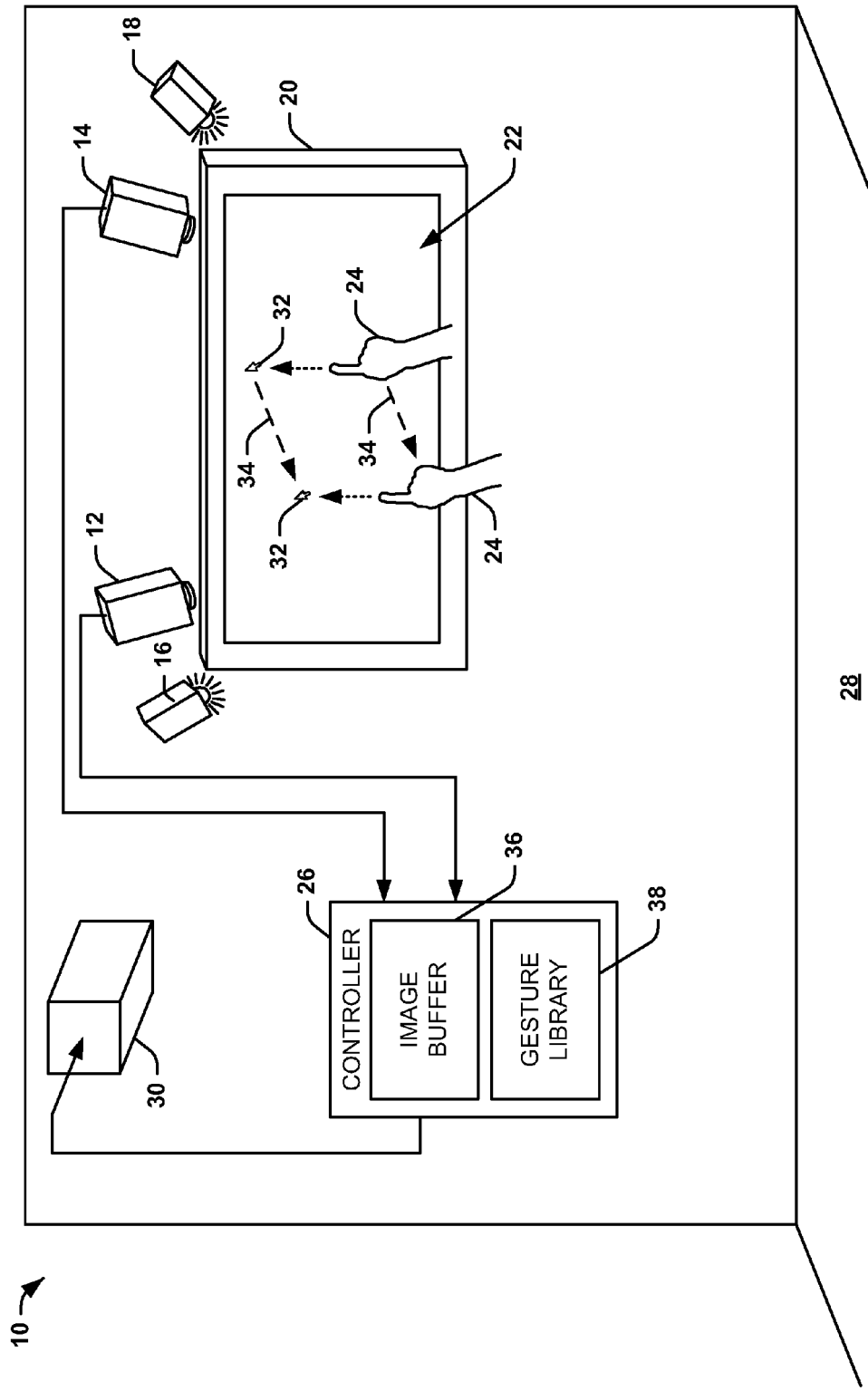
FIG. 1 illustrates an example of a gesture recognition interface system in accordance with an aspect of the invention.

The present invention relates generally to interface systems, and specifically to compound gesture recognition. A user employs an input object to provide simulated inputs to a computer or other electronic device. It is to be understood that the simulated inputs can be provided by compound gestures using the input object. For example, the user could provide gestures that include pre-defined motion using the input object in a gesture recognition environment, such as defined by a foreground of a display screen that displays visual content. The input object could be, for example, one or both of the user's hands; a wand, stylus, pointing stick; or a variety of other devices with which the user can gesture. The simulated inputs could be, for example, simulated mouse inputs, such as to establish a reference to the displayed visual content and to execute a command on portions of the visual content with which the reference refers. Thus, a compound gesture can be a gesture with which multiple sub-gestures can be employed to provide multiple related device inputs. For example, a first sub-gesture can be a reference gesture to refer to a portion of the visual content and a second sub-gesture can be an execution gesture that can be performed concurrently with or immediately sequential to the first sub-gesture, such as to execute a command on the portion of the visual content to which the first sub-gesture refers.

Any of a variety of gesture recognition interface systems can be implemented to recognize the compound gestures. As an example, one or more infrared (IR) light sources can illuminate a gesture recognition environment that is defined by the area of physical space in a foreground of a vertical or horizontal display surface. A set of stereo cameras can each generate a plurality of images of the input object. The plurality of images can be, for example, based on a reflected light contrast of the IR light reflected back from the input object relative to substantially non-reflected light or more highly reflected light from a retroreflective background surface. The plurality of images of the input object from each camera could be, for example, a plurality of matched sets of images of the input object, such that each image in the matched set of images corresponds to the input object from a different perspective at substantially the same time. A given matched set of images can be employed to determine a location of the input object and the plurality of matched sets of images can be employed to determine physical motion of the input object.

A controller can be configured to receive the plurality of images to determine three-dimensional location information associated with the input object. For example, the controller could apply an algorithm to determine features of the input object, such as endpoints, length, and pitch of elongated portions of the input object in three-dimensional space. The controller could then translate the simulated inputs into device inputs based on the three-dimensional location information. For example, the controller could interpret gesture inputs based on motion associated with the input object and translate the gesture inputs into inputs to a computer or other device. The controller could also compare the motion associated with the one or more endpoints of the input object with a plurality of pre-defined gestures stored in a memory, such that a match with a given pre-defined gesture could correspond with a particular device input.

FIG. 1 illustrates an example of a gesture recognition interface system 10 in accordance with an aspect of the invention. The gesture recognition interface system 10 includes a first camera 12, a second camera 14, a first IR light source 16, and a second IR light source 18 mounted above a vertical display surface 20. As an example, the vertical display surface 20 can be a projection screen. The first camera 12 and the second camera 14 may each include an IR filter, such that the respective camera may only be able to receive IR light. The first IR light source 16 and the second IR light source 18 each illuminate a gesture recognition environment 22 that is defined as the three-dimensional physical space in the foreground of the vertical display surface 20 that is visible by the first and second cameras 12 and 14.

An input object 24 can provide simulated inputs over the vertical display surface 20. In the example of FIG. 1, the input object 24 is demonstrated as a user's hand, such that the simulated inputs can be provided through hand gestures. It is to be understood that the use of a hand to provide simulated inputs via hand gestures is but one example implementation of the gesture recognition interface system 10. Examples of other types of input objects could include a stylus, wand, pointing stick, or any of a variety of devices that could provide gestures to simulate inputs. In addition, in the example of performing gestures via a user's hand as the input object 24 to provide simulated inputs, the user's hand could incorporate a glove and/or fingertip and knuckle sensors or could be a user's naked hand.

In the example of FIG. 1, the first camera 12 and the second camera 14 each receive separate images of the input object 24, where each of the separate images received, respectively, by the first camera 12 and the second camera 14 are a matched set (i.e., matched pair). As an example, each of the first camera 12 and the second camera 14 could rapidly take still photograph images at, for example, sixty times per second, such that each still photograph image taken by the first camera 12 is matched to a still photograph image taken by the second camera 14 at substantially the same time. The input object 24 can appear to be in a different location in each image of the matched set captured by each of the first camera 12 and the second camera 14, respectively, due to parallax caused by the different mounted locations of each of the first camera 12 and the second camera 14. In the example of FIG. 1, the first and second cameras 12 and 14 can each be positioned as angled toward the center of the vertical display surface 20, such as to provide for more accurate position determination of the input object 24.

In the example of FIG. 1, the images received by each of the first and second cameras 12 and 14 can be based on IR light that is reflected from the input object relative to substantially non-reflected light in the gesture recognition environment 22. Specifically, an object is illuminated at a relative brightness intensity that is $1/D^2$, where D is the distance from the light source. Thus, an object that is twice as far away as another appears four times dimmer. Accordingly, although some of the IR light emitted from the first and second IR light sources 16 and 18 may be reflected from the floor 28 beneath the vertical display surface 20, the intensity of the reflected light may be significantly less than that reflected from the input object 24.

The first camera 12 and the second camera 14 can each provide their respective separate images of the input object 24 to a controller 26. The controller 26 could reside, for example, within a computer (not shown) for which the gesture recognition interface system 10 is designed to provide a gesture recognition interface. It is to be understood, however, that the hosting of a controller is not limited to a standalone computer, but could be included in embedded processors. The controller 26 can process the respective images associated with the input object 24 to generate three-dimensional location data associated with the input object 24.

For example, each of the first camera 12 and the second camera 14 could each be mounted at pre-determined angles relative to the floor 28 beneath the vertical display surface 20. For a given matched pair of images of the input object 24, if the pre-determined angles of each of the cameras 12 and 14 are equal, then each point of the input object 24 in two-dimensional space in a given image from the camera 12 is equidistant from a corresponding point of the input object 24 in the respective matched image from the camera 14. As such, the controller 26 could determine the three-dimensional physical location of the input object 24 based on a relative parallax separation of the matched set of images of the input object 24 at a given time. In addition, using a computer algorithm, the controller 26 could also determine the three-dimensional physical location of features associated with portions of the input object 24, such as fingers and fingertips. As an example, the controller 26 can be configured to determine and interpret the gestures that are provided in the gesture recognition environment in any of a variety of ways, such as those described in either of U.S. patent applications entitled "Gesture Recognition Interface System", Ser. No. 11/485,788, filed Jul. 13, 2006, and "Gesture Recognition Interface System with Vertical Display", Ser. No. 12/133,836, filed Jun. 5, 2008, each assigned to the same assignee as the Present Application and incorporated herein by reference in its entirety.

The gesture recognition interface system 10 can also include a projector 30. The projector 30 can provide visual content with which the user can interact and provide inputs. In the example of FIG. 1, the projector 30 can project the visual content onto the vertical display surface 20. Because the IR light sources 16 and 18 do not illuminate visible light, the IR illumination may not interfere with the visual content projected from the projector 30. The user can thus employ the input object 24 in the gesture recognition environment 22 to simulate inputs in an interactive manner with the visual content.

As an example, the controller 26 can determine compound gestures that are performed by a user using the input object 24 and can translate the compound gestures into simulated mouse inputs. For example, the controller 26 could interpret pointing at the vertical display surface 20 by the input object 24, such as with an extended index finger, to establish a reference 32 on the visual content that is displayed on the vertical display surface 20. In the example of FIG. 1, the reference 32 is demonstrated as a mouse cursor, but it is to be understood that the reference 32 could be programmed in any of a variety of ways to refer to specific portions of the visual content. Thus, the controller 26 can be configured to interpret two-dimensional motion of the end-point of the extended index finger of the input object 24 across the vertical display surface 20 as a motion of the reference 32 across the visual content, as demonstrated in the example of FIG. 1 by the arrows 34.

The establishment of the reference 32 can be a first of multiple sub-gestures of a compound gesture. Specifically, an additional sub-gesture can be implemented using the input object 24, or an additional input object such as the user's other hand, to perform an execution gesture that can be translated as an execution command to interact with a portion of the visual content with which the reference 32 refers, such as based on a visual overlapping. The portion of the visual content with which the reference 32 overlaps could be an active portion, such as could provide interaction in response to execution commands. Therefore, the controller 26 can interpret the additional sub-gesture of the compound gesture as a left mouse-click, a right mouse-click, a double mouse-click, or a click-and-hold. Accordingly, a user of the gesture recognition interface system 10 could navigate through a number of computer menus, graphical user interface (GUI) icons, and/or execute programs associated with a computer merely by moving his or her fingertip through the air in the gesture recognition environment 22 and initiating one or more complementary gestures without touching a mouse or the vertical display surface 20.

Figure 2:
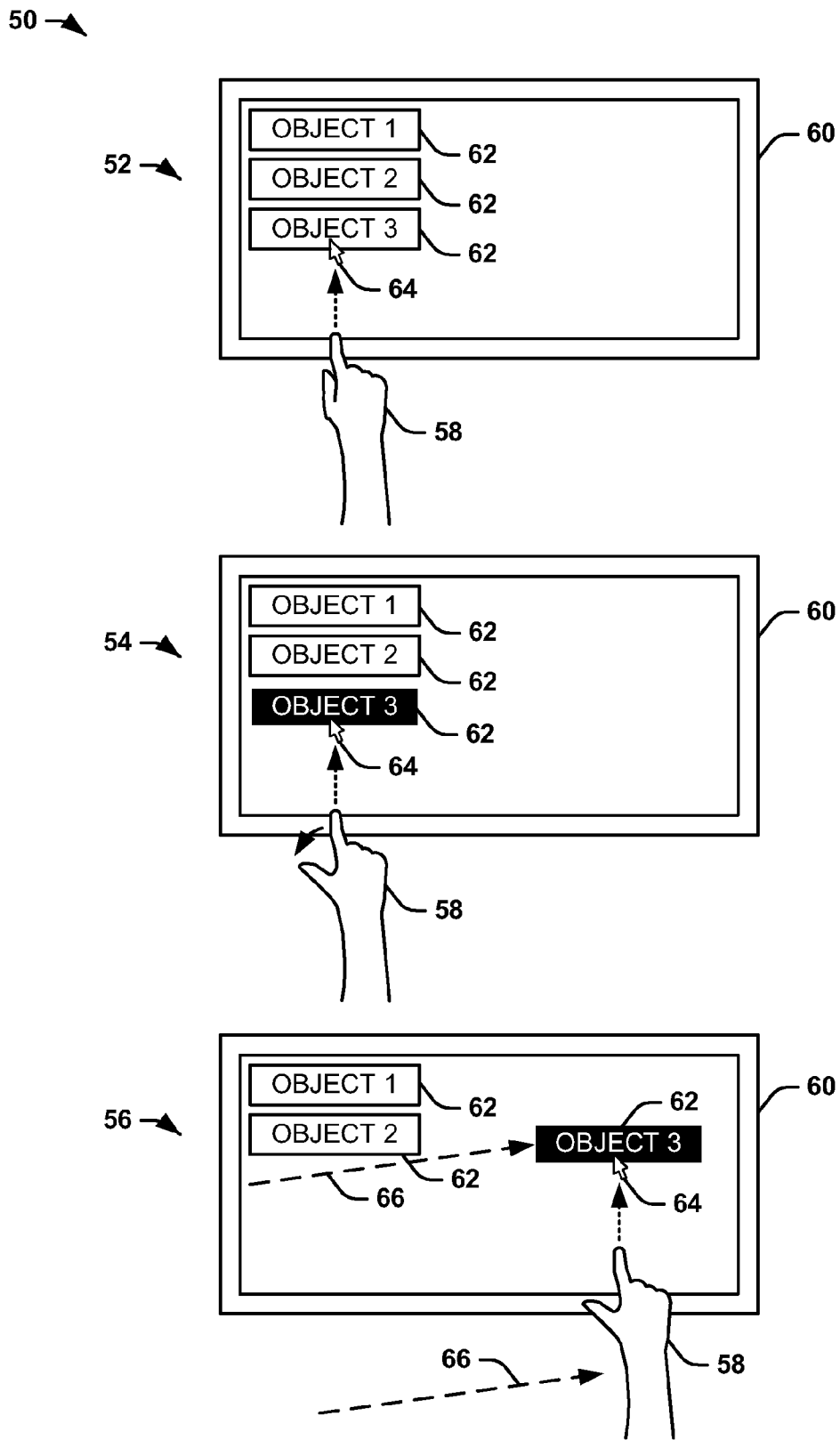
FIG. 2 illustrates an example of a diagram depicting device inputs that are implemented via a compound hand gesture in accordance with an aspect of the invention.

FIG. 2 illustrates an example of a diagram 50 depicting device inputs that are implemented via a compound hand gesture in accordance with an aspect of the invention. The diagram 50 can correspond to a compound hand gesture that is performed in any of a variety of gesture recognition interface systems, such as the gesture recognition interface system 10 in the example of FIG. 1. The diagram 50 is demonstrated in the example of FIG. 2 as having a first portion 52, a second portion 54, and a third portion 56.

The first portion 52 of the diagram 50 demonstrates a user's hand 58 performing a first sub-gesture, such that the user's hand 58 is implemented as an input object in the associated gesture recognition interface system. The first sub-gesture is demonstrated in the example of FIG. 2 as an extended index finger pointing at a display surface 60 that displays visual content. In the example of FIG. 2, the visual content is demonstrated as three icons 62 labeled OBJECT 1, OBJECT 2, and OBJECT 3 on a background field (i.e., desktop surface).

As an example, the icons 62 can correspond to folders, files, and/or executable programs. As a result of an associated controller (not shown) determining the first sub-gesture of the pointed index finger, the associated controller can translate the first sub-gesture to a device input that establishes a reference 64 superimposed on the visual content. Therefore, the first sub-gesture corresponds to a reference gesture to refer to specific portions of the visual content on the display surface 60. Accordingly, the reference 64 can move across the visual content on the display surface 60 in response to lateral or angular movement of index finger of the user's hand 58.

The second portion 54 of the diagram 50 demonstrates that, upon the reference 64 referring to OBJECT 3, the user performs a second sub-gesture of the compound gesture with the hand 58 by extending the thumb of the hand 58. The second sub-gesture that is performed by extending the thumb of the hand 58 can thus be an execution gesture. Therefore, in the second portion 54 of the diagram 50, the extension of the thumb could be translated by the associated controller as a "click-and-hold" command, such as to simulate a click-and-hold of a left mouse button. Accordingly, in the second portion 54 of the diagram 50, OBJECT 3 is selected for interaction by the user merely by the extension of the thumb.

The third portion 56 of the diagram 50 demonstrates the interaction of OBJECT 3 based on the user implementing the first gesture of the compound gesture. Specifically, as demonstrated in the example of FIG. 2 by the arrows 66, as the user maintains the first sub-gesture (i.e., the extended index finger) and the second sub-gesture (i.e., the extended thumb), the user can move OBJECT 3 across the desktop background environment of the visual content by moving his or her hand 58 across the display surface 60. In other words, by maintaining the reference sub-gesture of the compound gesture to establish the reference 64 and the execution sub-gesture of the compound gesture to select OBJECT 3 for interaction, the user can perform a click-and-drag device input with the compound gesture, such as could be implemented by a mouse. The user could thus deselect OBJECT 3, for example, by retracting the thumb or the finger, or by removing the hand 58 from the gesture recognition environment.

The example of FIG. 2 therefore demonstrates one example of a compound gesture, such that the compound gesture includes a reference gesture and an execution gesture that are translated to perform related device inputs. It is to be understood, however, that the diagram 50 is not intended to be limited to the example of FIG. 2. As an example, the reference gesture could be performed by extending any of the fingers of the hand 58, or by extending multiple fingers, such as both the index and middle fingers. As another example, the execution gesture could be performed by extending another finger other than or in addition to the thumb, such as by extending the small (i.e., pinky) finger. Accordingly, any of a variety of compound gestures could be implemented to perform the click-and-drag device inputs demonstrated in the example of FIG. 2.

The compound gesture that is demonstrated in the example of FIG. 2 is such that the reference gesture and the execution gesture are concurrently performed. Referring back to the example of FIG. 1, the controller 26 could thus translate both the reference and execution gestures concurrently. However, for a given compound gesture, the execution gesture could be such that it requires use of the feature of the input object 24 that is implemented for the reference gesture. As an example, the execution gesture for a given compound gesture may require the user to use his or her index finger, such that it may no longer be able to refer to the portion of the visual content on which the execution command is to be performed based on the execution gesture. Therefore, the controller 26 may be configured to translate the reference gesture and the execution gesture of a given compound gesture sequentially to ensure that the execution command is performed on the appropriate portion of the visual content.

In the example of FIG. 1, the controller 26 includes an image buffer 36 that is configured to store the sequentially obtained images from each of the first and second cameras 12 and 14. As an example, the image buffer 36 can be a memory that is configured as a queue, such that new images that are obtained by the first and second cameras 12 and 14 are provided to the image buffer 36 to overwrite the oldest images that are stored therein. The sequential images that are stored in the image buffer 36 can be used by the controller 26 to translate the gestures that are performed in the gesture recognition environment 22 into the device inputs. For example, the controller 26 can be configured to analyze the sequential images that are stored in the image buffer 36 to ascertain three-dimensional motion associated with features of the input object 24. The controller 26 can thus compare the three-dimensional motion with pre-defined gestures that are stored in a pre-defined gesture library 38. Accordingly, the controller 26 can determine the appropriate device inputs based on the performance of the corresponding gestures.

In addition to translating the gestures into device inputs based on the sequential images stored in the image buffer 36, the controller 26 can also access the sequential images that are stored in the image buffer 36 to identify a portion of the visual content to which a reference gesture was referring prior to the performance of a subsequently performed execution gesture. As an example, the controller 26 can monitor an amount of time that a reference gesture refers to a given portion of the visual content and/or an amount of time between the termination of a reference gesture and the performance of an execution gesture. Accordingly, the controller 26 can associate the execution gesture with the reference gesture based on one or timing thresholds, such that the controller 26 can access previous images in the sequential images stored in the image buffer 36 to perform the corresponding execution command on the appropriate portion of the visual content.

Figure 3:
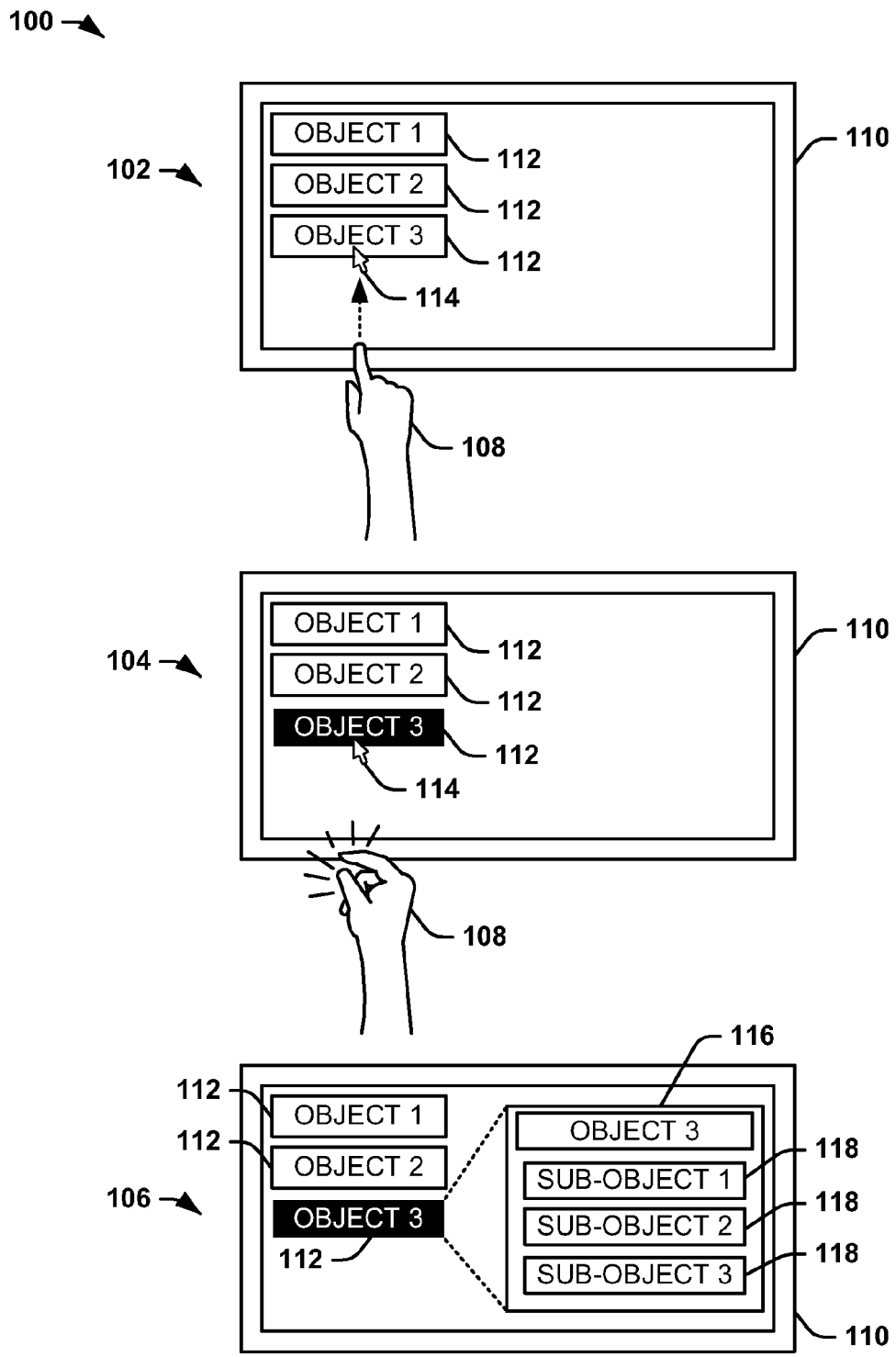
FIG. 3 illustrates another example of a diagram depicting device inputs that are implemented via a compound hand gesture in accordance with an aspect of the invention.

FIG. 3 illustrates another example of a diagram 100 depicting device inputs that are implemented via a compound hand gesture in accordance with an aspect of the invention. The diagram 100 can correspond to a compound hand gesture that is performed in any of a variety of gesture recognition interface systems, such as the gesture recognition interface system 10 in the example of FIG. 1. The diagram 100 is demonstrated in the example of FIG. 3 as having a first portion 102, a second portion 104, and a third portion 106.

The first portion 102 of the diagram 100 demonstrates a user's hand 108 performing a first sub-gesture, such that the user's hand 108 is implemented as an input object in the associated gesture recognition interface system. The first sub-gesture is demonstrated in the example of FIG. 3 as an extended index finger pointing at a display surface 110 that displays visual content. In the example of FIG. 3, the visual content is demonstrated as three icons 112 labeled OBJECT 1, OBJECT 2, and OBJECT 3 on a background field, similar to the example of FIG. 2. As an example, the icons 112 can correspond to folders, files, and/or executable programs. In the example of FIG. 3, OBJECT 3 is demonstrated as a desktop folder, as will be demonstrated in greater detail below. As a result of an associated controller (not shown) determining the first sub-gesture of the pointed index finger, the associated controller can translate the first sub-gesture to a device input that establishes a reference 114 superimposed on the visual content. Therefore, the first sub-gesture corresponds to a reference gesture to refer to specific portions of the visual content on the display surface 110. Accordingly, the reference 114 can move across the visual content on the display surface 110 in response to lateral or angular movement of index finger of the user's hand 108.

The second portion 104 of the diagram 100 demonstrates that, upon the reference 114 referring to OBJECT 3, the user performs a second sub-gesture of the compound gesture with the hand 108 by snapping the fingers of the hand 108. The second sub-gesture that is performed by snapping the fingers of the hand 108 can thus be an execution gesture. Therefore, in the second portion 104 of the diagram 100, the snapping of the fingers could be translated by the associated controller as an execution command, such as to simulate a double click of a left mouse button.

As demonstrated in the example of FIG. 3, the first sub-gesture, (i.e., the reference gesture) is no longer being implemented by the user as the user as the user performs the second sub-gesture (i.e., the execution gesture). Therefore, as described above in the example of FIG. 1, the associated controller may be configured to access buffered images of the hand 108 to determine which portion of the visual content the user was referring prior to performing the execution gesture. Thus, in the example of FIG. 3, the associated controller determines that it was OBJECT 3 that was being referred to by the reference gesture. Accordingly, the associated controller translates the execution gesture as an execution command on OBJECT 3.

The third portion 106 of the diagram 100 demonstrates the effect of the execution command that is performed on OBJECT 3. Specifically, as described above, OBJECT 3 is configured as a desktop folder. Therefore, the effect of a simulated double left mouse-click is to open the desktop folder, demonstrated in the example of FIG. 3 by a sub-window 116 labeled OBJECT 3. The sub-window 116 includes additional icons 118, labeled SUB-OBJECT 1, SUB-OBJECT 2, and SUB-OBJECT 3, which could likewise be configured as folders, files, and/or executable programs. Accordingly, the user can again perform a reference gesture and/or one or more additional execution gestures to navigate through the additional icons 118, such as similar to mouse inputs, without touching the display surface 110 or a mouse.

The example of FIG. 3 therefore demonstrates one example of a compound gesture, such that the compound gesture includes a reference gesture and an execution gesture that are translated to perform related device inputs. It is to be understood, however, that the diagram 50 is not intended to be limited to the example of FIG. 3. As will be demonstrated in the examples of FIGS. 4-7, any of variety of compound gestures can be performed to simulate a double left mouse-click. In addition, the associated gesture recognition interface system could include additional input components, such as a microphone that can be configured to perform the execution command in response to the audible clicking sound of the clicked fingers. Accordingly, any of a variety of compound gestures could be implemented to perform the double left mouse-click input demonstrated by the compound gesture in the example of FIG. 3.

Referring back to the example of FIG. 1, it is to be understood that the gesture recognition interface system 10 is not intended to be limited to the example of FIG. 1. As an example, the gesture recognition interface system 10 is not limited to using IR reflection contrast to determine the gestures that are performed in the gesture recognition environment 22. For example, the user could implement any of a variety of sensors on his or her hands, or could implement hand-held devices that include sensors to perform the gestures. As another example, the gesture recognition interface system 10 can include a horizontal display surface instead of a vertical display surface, as is demonstrated in greater detail with respect to the example of FIG. 8 below. In addition, the compound gestures that are implemented in the gesture recognition interface system 10 are not limited to three-dimensional gestures, but could incorporate two-dimensional compound gestures instead of or in addition to three-dimensional compound gestures. Furthermore, the gesture recognition interface system 10 need not include a display surface, but that other types of displays, such as holographic and/or non-planar displays, can be implemented. Accordingly, the gesture recognition interface system 10 can be configured in any of a variety of ways.

Figure 4:
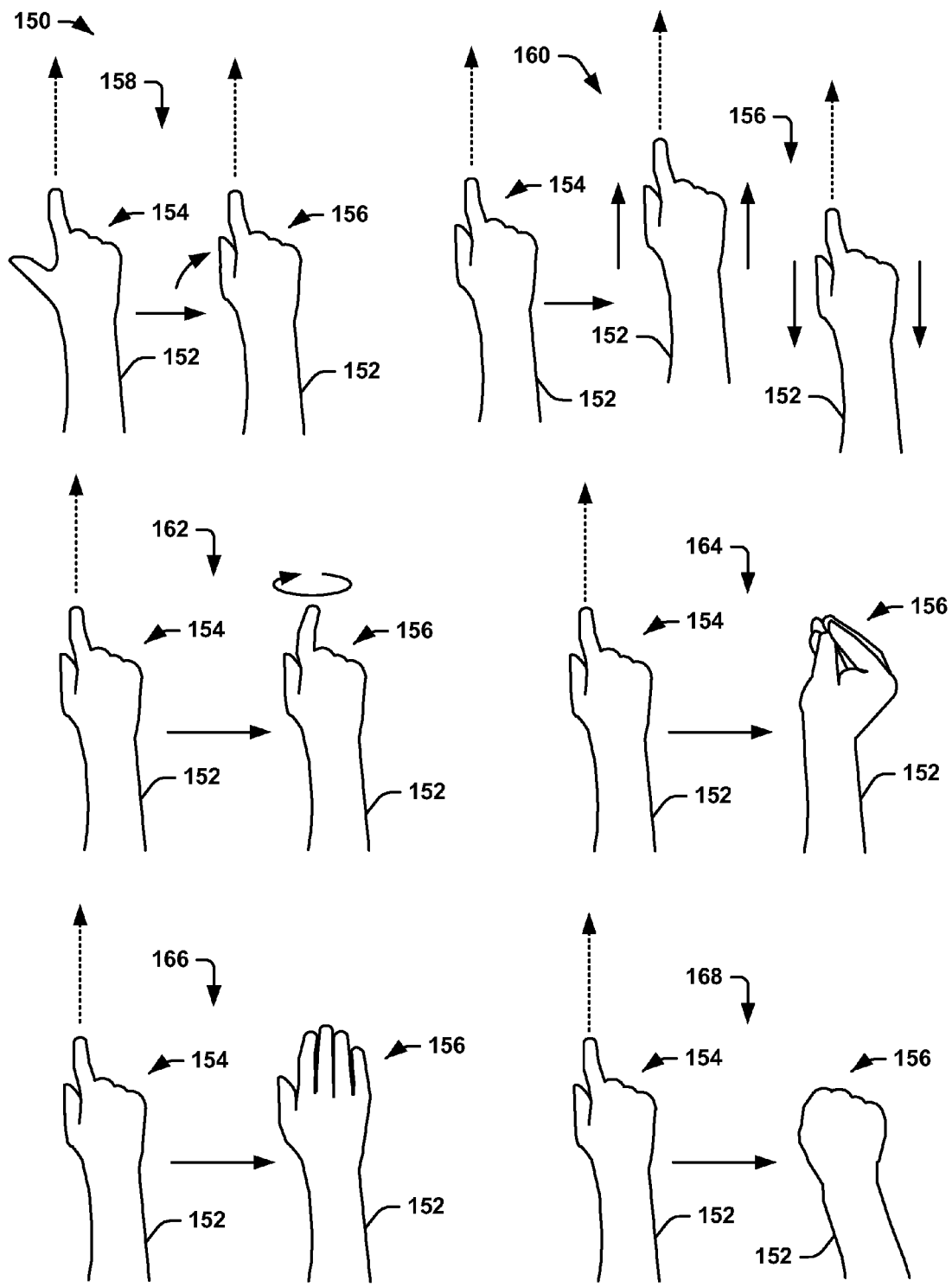
FIG. 4 illustrates an example of a diagram of compound hand gestures for use in a gesture recognition interface system in accordance with an aspect of the invention.

FIG. 4 illustrates an example of a diagram 150 of compound hand gestures for use in a gesture recognition interface system in accordance with an aspect of the invention. As an example, the compound hand gestures in the diagram 150 can each be implemented in a gesture recognition interface system, such as the gesture recognition interface system 10 in the example of FIG. 1. As such, reference is to be made to the example of FIG. 1 in the following description of the example of FIG. 4.

The diagram 150 includes a set of compound gestures that each involve the use of a user's hand 152 to perform the compound gestures. Each of the compound gestures demonstrated in the example of FIG. 4 are demonstrated with the user's hand 152 beginning at a reference gesture 154. As such, an extended index finger points to a portion of the visual content to which the compound gesture refers, and thus to which an associated execution gesture is to be translated for an execution command. In addition, each of the compound gestures demonstrated in the example of FIG. 4 illustrate an execution gesture 156 that is performed with the same hand 152. Furthermore, each one of the compound gestures demonstrated in the diagram 150 can correspond to a different execution command for interacting with the portion of the visual content in different ways. Accordingly, all or a subset of all of the compound gestures demonstrated in the diagram 150 can be implemented in the gesture recognition interface system 10.

A first compound gesture 158 is demonstrated in the diagram 150 as similar to the compound gesture demonstrated in the example of FIG. 2. Specifically, the first compound gesture 158 is a compound gesture that is a reverse of the compound gesture demonstrated in the example of FIG. 2. In the first compound gesture 158, the reference gesture 154 is demonstrated as the user extending the thumb of the hand 152. Therefore, the execution gesture 156 is demonstrated as the user having retracted the thumb of the hand 152. Thus, a user can maintain the reference gesture 154 while performing the execution gesture 156, similar to the compound gesture described above in the example of FIG. 2. As an example, the first compound gesture 158 can be implemented to perform a click-and-drag mouse command, similar to as described above in the example of FIG. 2. As another example, the first compound gesture 158 could also be configured to perform a mouse double-click, a right mouse-click, or any of a variety of other commands.

A second compound gesture 160 is demonstrated in the diagram 150 as beginning with the reference gesture 154. However, the execution gesture 156 is demonstrated as the user maintaining the reference gesture 154 with the hand 152, except that the hand 152 is thrust forward and backward rapidly. Thus, the controller 26 can interpret the execution gesture 156 based on the rapid change forward and backward of the hand 152. In addition, a user can maintain the reference gesture 154 while performing the execution gesture 156, similar to the compound gesture described above in the example of FIG. 2, such that the controller 26 can determine both the reference and execution gestures 154 and 156 concurrently. As an example, the second compound gesture 160 can be configured to select a desktop icon, which can subsequently be dragged across the vertical display surface 20 until an additional gesture is performed, or until the user retracts the hand 152 from the gesture recognition environment. As another example, the second compound gesture 160 can be implemented to double-click or right-click a desktop icon.

A third compound gesture 162 is demonstrated in the diagram 150 as beginning with the reference gesture 154. However, the execution gesture 156 is demonstrated as the user maintaining the extension of the index finger while rotating the index finger in a circle. As an example, the third compound gesture 162 can be configured to scroll through a document or list that is displayed on the vertical display surface 20, depending on the direction of rotation of the index finger. For example, the controller 26 could be configured to access the image buffer 36 to determine the document or list to which the reference gesture 154 referred prior to the execution gesture 156. As another example, the third compound gesture 162 could be combined with another gesture, such that the list or document could be selected with a different compound gesture prior to the execution gesture 156 of the third compound gesture 162.

A fourth compound gesture 164 is demonstrated in the diagram 150 as beginning with the reference gesture 154. However, the execution gesture 156 is demonstrated as the user forming a claw-grip with the thumb and all fingers. As an example, the fourth compound gesture 164 could be implemented to select a portion of the visual content for movement or for manipulation. It is to be understood that the fourth compound gesture 164 could include a subset of all of the fingers formed as a claw-grip, or each different amount or set of fingers could correspond to a different execution command. In addition, the claw-grip need not be implemented with the fingers and/or thumb touching, but could just include the fingers and/or thumb being slightly extended and bent.

A fifth compound gesture 166 is demonstrated in the diagram 150 as beginning with the reference gesture 154. However, the execution gesture 156 is demonstrated as the user forming an open palm. A sixth compound gesture 168 is demonstrated in the diagram 150 as beginning with the reference gesture 154, with the execution gesture 156 being demonstrated as the user forming a closed fist. As an example, the fifth compound gesture 166 and/or the sixth compound gesture 168 could be implemented to select a portion of the visual content for movement or for manipulation. In addition, for example, either of the fifth compound gesture 166 and the sixth compound gesture 168 could include motion of the thumb to incorporate a different execution gesture.

The diagram 150 in the example of FIG. 4 thus demonstrates several examples of compound gestures that can be implemented with the gesture recognition interface system 10 in the example of FIG. 1. However, it is to be understood that the diagram 150 is not intended to be limited to these compound gestures. Specifically, slight variations of the compound gestures demonstrated in the diagram 150 can be implemented in the gesture recognition interface system 10. As an example, in any of the compound gestures in the diagram 150, the reference gesture 154 can be performed with the thumb extended instead of retracted, similar to the first compound gesture 158. As another example, in the first compound gesture 158, the user can rapidly retract and re-extend the extended index finger to perform the execution gesture 156, instead of retracting the thumb. Accordingly, any of a variety of different gestures can be employed to provide gesture inputs via the gesture recognition interface system 10.

Figure 5:
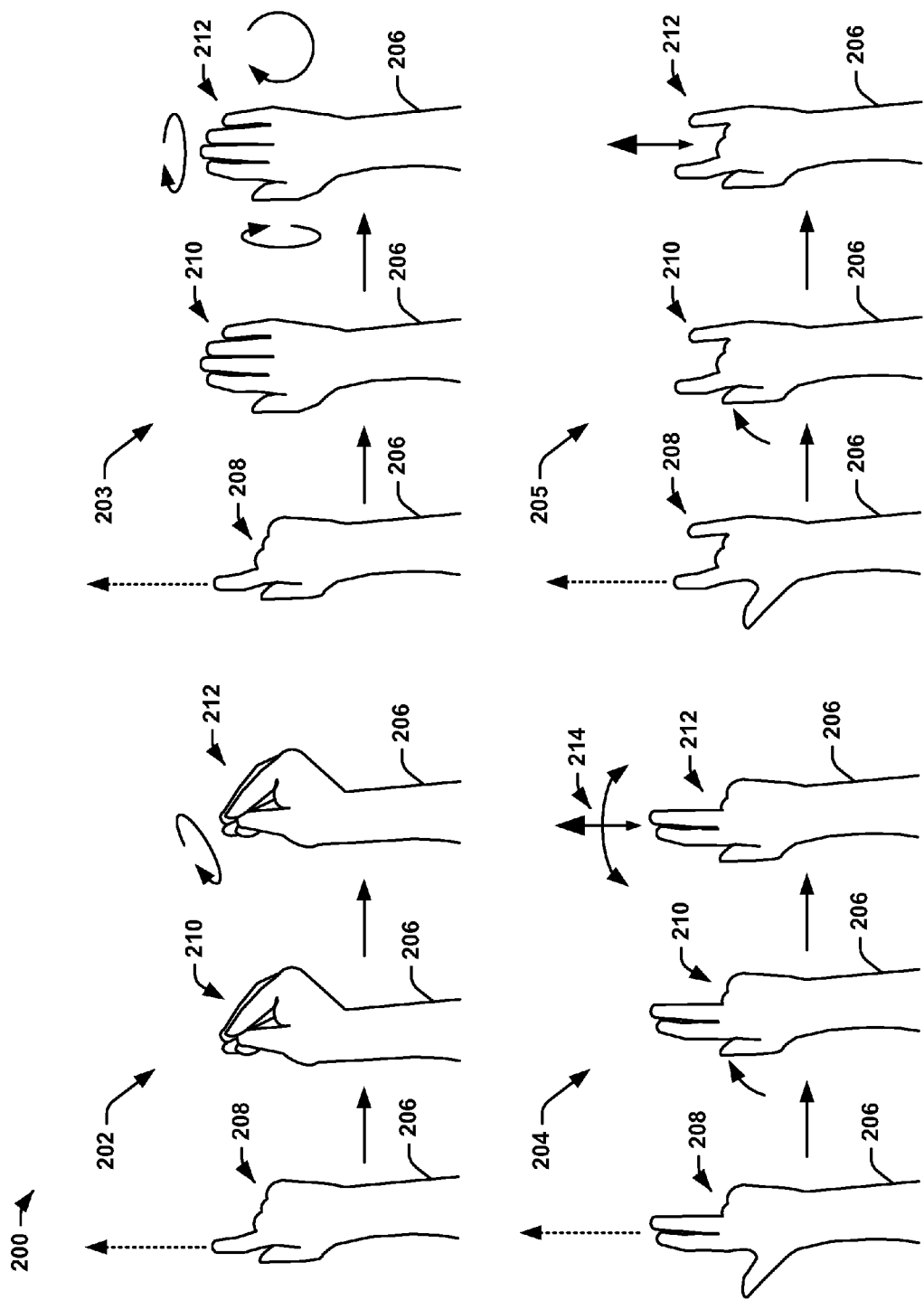
FIG. 5 illustrates another example of a diagram of compound hand gestures for use in a gesture recognition interface system in accordance with an aspect of the invention.

FIG. 5 illustrates another example of a diagram 200 of compound hand gestures for use in a gesture recognition interface system in accordance with an aspect of the invention. As an example, the compound hand gestures in the diagram 200 can each be implemented in a gesture recognition interface system, such as the gesture recognition interface system 10 in the example of FIG. 1. As such, reference is to be made to the example of FIG. 1 in the following description of the example of FIG. 5.

The diagram 200 includes a first compound gesture 202, a second compound gesture 203, a third compound gesture 204, and a fourth compound gesture 205 that all involve the use of a user's hand 206 to perform the compound gestures. Each of the compound gestures demonstrated in the example of FIG. 5 are demonstrated with the user's hand 206 beginning at a reference gesture 208. As such, one or more extended fingers point to a portion of the visual content to which the compound gesture refers, and thus to which an associated execution gesture is to be translated for an execution command. Specifically, in the first and second compound gestures 202 and 203, the user's extended index finger is used as the reference gesture 208. In the third compound gesture 204, the user's extended index and middle fingers are used as the reference gesture 208, and in the fourth compound gesture 205, the user's extended index and pinky fingers are used as the reference gesture 208. In addition, each of the compound gestures demonstrated in the example of FIG. 5 illustrate a first execution gesture 210 and a second execution gesture 212 that is performed with the same hand 206. As an example, the first execution gesture 210 can be performed to select the portion of the visual content for interaction and the second execution gesture 212 can be performed to manipulate the portion of the visual content. Furthermore, both of the compound gestures demonstrated in the diagram 200 can correspond to a different execution command for interacting with the portion of the visual content in different ways. Accordingly, both of the compound gestures demonstrated in the diagram 200 can be implemented in the gesture recognition interface system 10.

The first compound gesture 202 is demonstrated in the diagram 150 as similar to the fourth compound gesture 164 demonstrated in the example of FIG. 4. Specifically, the first execution gesture 210 is demonstrated as the user forming a claw-grip with the thumb and all fingers. It is to be understood that the first compound gesture 202 could include a subset of all of the fingers formed as a claw-grip, or each different amount or set of fingers could correspond to a different execution command. As an example, the first execution gesture 210 could be implemented to select a portion of the visual content. Therefore, the second execution gesture 212 can be performed to interact with the selected portion of the visual content. Specifically, as an example, the user can rotate and/or move the hand 206 to correspondingly rotate and/or move the selected portion of the visual content.

The second compound gesture 203 is demonstrated in the diagram 200 as similar to the fifth compound gesture 166 demonstrated in the example of FIG. 4. Specifically, the first execution gesture 210 is demonstrated as the user forming an open palm. As an example, the first execution gesture 210 could be implemented to select a portion of the visual content. Therefore, the second execution gesture 212 can be performed to interact with the selected portion of the visual content. Specifically, as an example, the user can move the hand 206 in six-degrees of freedom, such that the hand can be moved axially in the X, Y, and Z directions, as well as rotated with respect to yaw, pitch, and roll. Accordingly, the selected portion of the visual content can correspondingly be moved in six-degrees of freedom.

The third compound gesture 204 is demonstrated in the diagram 150 as similar to the first compound gesture 168 demonstrated in the example of FIG. 4, with the exception of the reference gesture 208, as described above. Specifically, the first execution gesture 210 is demonstrated as the user retracting the thumb. As an example, the first execution gesture 210 could be implemented to select a portion of the visual content. Therefore, the second execution gesture 212 can be performed to interact with the selected portion of the visual content. Specifically, as demonstrated in the example of FIG. 5, the user can tilt and/or pan the portion of the visual content, such as based on pivoting the hand 206 about the wrist, to correspondingly tilt and/or pan the selected portion of the visual content, as demonstrated by the arrows 214.

The fourth compound gesture 205 is demonstrated in the diagram 200 as similar to the first compound gesture 168 demonstrated in the example of FIG. 4, with the exception of the reference gesture 208, as described above. Specifically, the first execution gesture 210 is demonstrated as the user retracting the thumb. As an example, the first execution gesture 210 could be implemented to select a portion of the visual content, such as including a scrollable window. Therefore, the second execution gesture 212 can be performed to interact with the selected portion of the visual content. Specifically, as demonstrated in the example of FIG. 5, the user can move the hand 206 up and down, such as by moving the user's arm or pivoting the hand 206 about the wrist, to implement a scrolling of the visual content that is displayed in the scrollable window. The scrolling of the visual content can be a slow scroll or could be a fast scroll, such as similar to pressing a scroll wheel on a mouse and moving the mouse up and down. In addition, the user could incorporate an additional gesture to control or toggle between speeds associated with the scrolling of the visual content, such as by retracting the pinky finger to implement fast scrolling from slow scrolling.

The diagram 200 in the example of FIG. 5 thus demonstrates examples of compound gestures that can include more than one execution gesture, such as could be implemented with the gesture recognition interface system 10 in the example of FIG. 1. It is to be understood that the diagram 200 is not intended to be limited to these compound gestures, but that any of a variety of different gestures can be employed to provide gesture inputs via the gesture recognition interface system 10. Furthermore, similar to as described above in the example of FIG. 4, variations of the compound gestures demonstrated in the diagram 200 can be implemented to provide inputs in the gesture recognition interface system 10.

Figure 6:
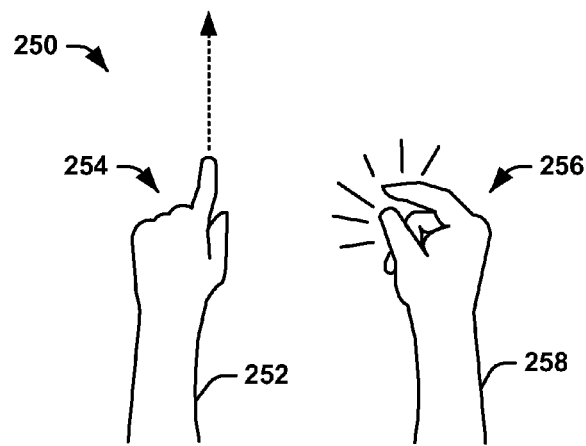
FIG. 6 illustrates an example of a two-handed compound gesture for use in a gesture recognition interface system in accordance with an aspect of the invention.

FIG. 6 illustrates an example of a two-handed compound gesture 250 for use in a gesture recognition interface system in accordance with an aspect of the invention. As an example, the two-handed compound hand gesture in the diagram 250 can be implemented in a gesture recognition interface system, such as the gesture recognition interface system 10 in the example of FIG. 1. As such, reference is to be made to the example of FIG. 1 in the following description of the example of FIG. 6.

The two-handed compound gesture 250 demonstrated in the example of FIG. 6 is demonstrated with a user's left hand 252 performing a reference gesture 254. As such, an extended index finger points to a portion of the visual content to which the two-handed compound gesture 250 refers, and thus to which an associated execution gesture 256 is to be translated for an execution command. However, contrary to the compound gestures demonstrated in the examples of FIGS. 4 and 5, the two-handed compound gesture 250 in the example of FIG. 6 is performed such that the execution gesture 256 is performed by the right hand 258 of the user. Specifically, the right hand 258 is demonstrated as snapping the fingers, similar to the compound gesture demonstrated in the example of FIG. 3. Thus, a user can maintain the reference gesture 254 while performing the execution gesture 256, and can combine the execution gesture 256 with one or more execution gestures that can be performed with the left hand 252, such as any of a variety of the compound gestures demonstrated in the example of FIGS. 4 and 5.

The example of FIG. 6 therefore demonstrates the additional possible compound gestures and combinations of compound gestures that can be implemented by using both the user's hands in the gesture recognition interface system 10. It is to be understood that the compound gesture 250 need not be limited to the use of both of the hands 252 and 258 to perform the reference and execution gestures 254 and 256, respectively. As an example, the user could hold a stylus or wand with the left hand 252 to perform the reference gesture instead of using the extended index finger. It is also to be understood that the gesture recognition interface system 10 can be configured to recognize the reference and execution gestures 254 and 256, regardless of which hand 252 and 258 is performing them. Therefore, either of the hands 252 and 258 can be implemented to perform the reference and execution gestures 254 and 256 for any given user.

Figure 7:
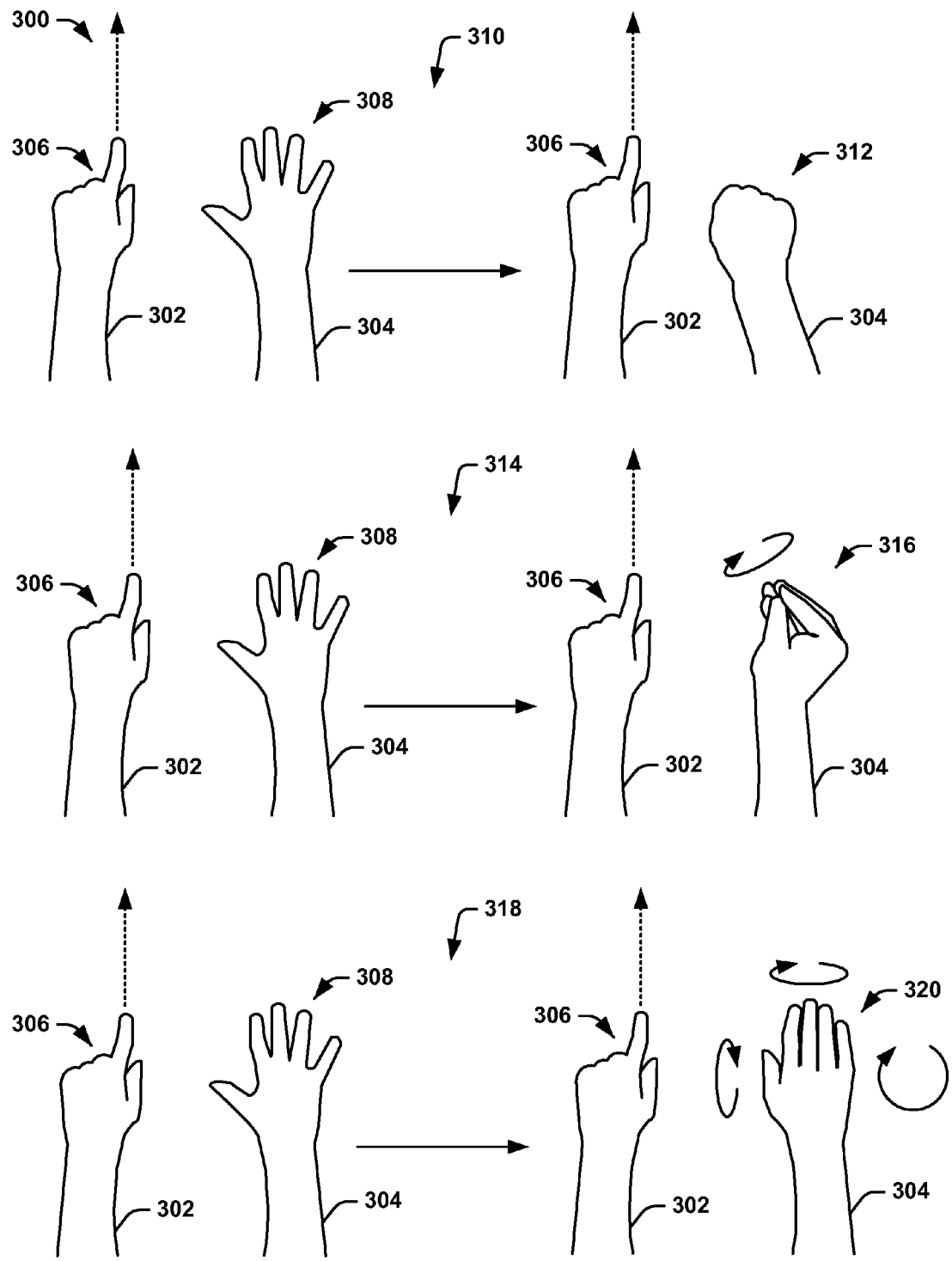
FIG. 7 illustrates an example of a diagram of a set of two-handed compound gestures for use in a gesture recognition interface system in accordance with an aspect of the invention.

FIG. 7 illustrates an example of a diagram 300 of a set of two-handed compound gestures for use in a gesture recognition interface system in accordance with an aspect of the invention. As an example, the compound hand gestures in the diagram 300 can each be implemented in a gesture recognition interface system, such as the gesture recognition interface system 10 in the example of FIG. 1. As such, reference is to be made to the example of FIG. 1 in the following description of the example of FIG. 7.

The diagram 300 includes a set of compound gestures that each involve the use of a user's left hand 302 and right hand 304 to perform the compound gestures. Each of the compound gestures demonstrated in the example of FIG. 7 are demonstrated with the user's left hand 302 beginning at a reference gesture 306 and the user's right hand 304 positioned at a ready position 308. In the example of FIG. 7, the ready position 308 is demonstrated as the right hand 304 having each finger and the thumb extended. As such, the extended index finger of the left hand 302 points to a portion of the visual content to which the compound gesture refers, and thus to which an associated execution gesture to be performed by the right hand 304 is to be translated for an execution command. In addition, each one of the compound gestures demonstrated in the diagram 300 can correspond to a different execution command for interacting with the portion of the visual content in different ways. Accordingly, all or a subset of all of the compound gestures demonstrated in the diagram 300 can be implemented in the gesture recognition interface system 10.

A first compound gesture 310 is demonstrated in the diagram 300 as similar to the compound gesture 168 demonstrated in the example of FIG. 4. Specifically, the first compound gesture 310 is demonstrated as the right hand 304 changing from the ready position 308 to an execution gesture 312 that includes forming the fingers and thumb of the right hand 304 into a closed fist. As an example, the first compound gesture 310 could be implemented to select a portion of the visual content for movement or for manipulation. In addition, for example, the first compound gesture 310 could include motion of the thumb of either the left hand 302 or the right hand 304 to incorporate a different execution gesture.

A second compound gesture 314 is demonstrated in the diagram 300 as similar to the compound gestures 164 and 202 demonstrated in the examples of FIGS. 4 and 5, respectively. Specifically, the second compound gesture 314 is demonstrated as the right hand 304 changing from the ready position 308 to an execution gesture 316 that includes forming a claw-grip with the thumb and all fingers. It is to be understood that the second compound gesture 314 could include a subset of all of the fingers formed as a claw-grip, or each different amount or set of fingers could correspond to a different execution command. As an example, the execution gesture 316 could be performed in two parts, similar to the compound gesture 202 in the example of FIG. 5. Specifically, the right hand 304 can form the claw-like grip as a first part of the execution gesture 316 to select a portion of the visual content to which the reference gesture 306 refers. Therefore, the user can rotate and/or move the right hand 304 to correspondingly rotate and/or move the selected portion of the visual content as the second part of the execution gesture 316.

A third compound gesture 318 is demonstrated in the diagram 300 as similar to the compound gestures 166 and 203 demonstrated in the examples of FIGS. 4 and 5, respectively. Specifically, the third compound gesture 318 is demonstrated as the right hand 304 changing from the ready position 308 to an execution gesture 320 that includes forming an open palm. As an example, similar to the compound gesture 314 described above, the execution gesture 320 could be performed in two parts, similar to the compound gesture 203 in the example of FIG. 5. Specifically, the right hand 304 can form the open palm as a first part of the execution gesture 320 to select a portion of the visual content to which the reference gesture 306 refers. Therefore, the user can move the right hand 304 in six-degrees of freedom as a second part of the execution gesture 320. As such, the right hand 304 can be moved axially in the X, Y, and Z directions, as well as rotated with respect to yaw, pitch, and roll, to move the selected portion of the visual content correspondingly in the six-degrees of freedom.

It is to be understood that the diagram 300 is not intended to be limiting as to the two-handed compound gestures that are capable of being performed in the gesture recognition interface system 10. As an example, the two-handed compound gestures are not limited to implementation of the extended fingers and thumb of the ready position 308 of the right hand, but that a different arrangement of fingers and the thumb could instead by implemented. As another example, it is to be understood that the two-handed compound gestures in the diagram 300 can be combined with any of a variety of other gestures, such as the single-handed compound gestures in the examples of FIGS. 4 and 5, or permutations thereof, to provide device inputs via the gesture recognition interface system 10. Furthermore, an execution gesture for a given two-handed compound gesture could include gestures associated with both hands 302 and 304 of the user. Accordingly, any of a variety of two-handed compound gestures can be implemented in the gesture recognition interface system 10.

Figure 8:
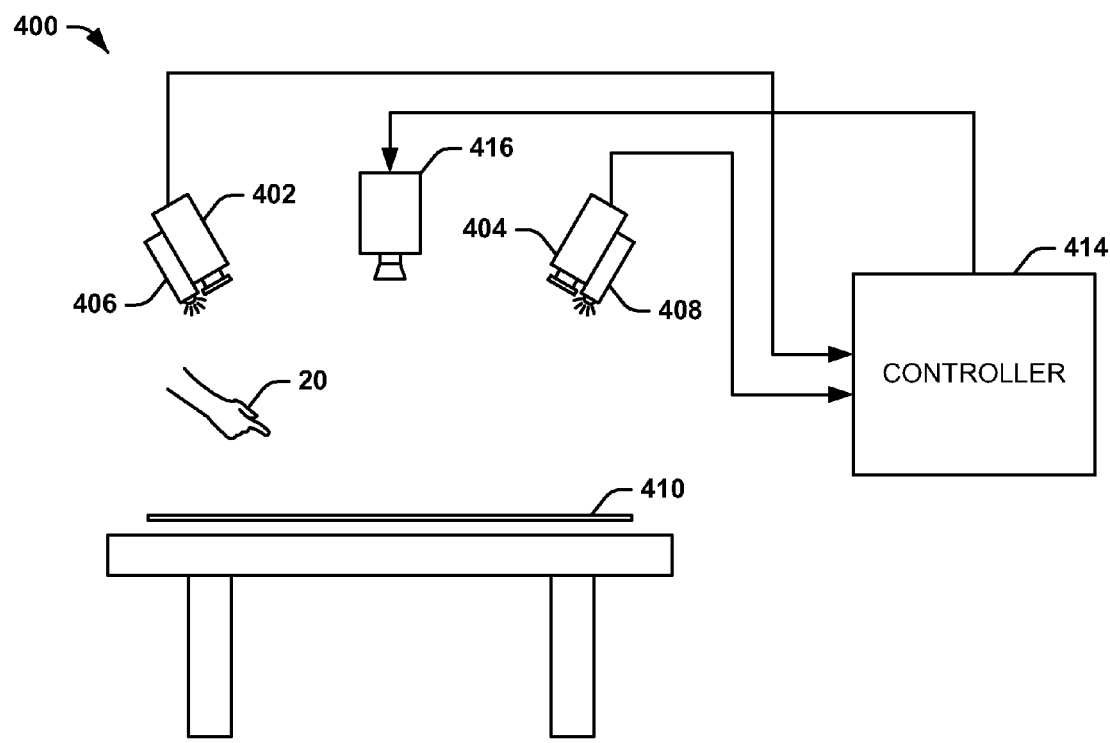
FIG. 8 illustrates another example of a gesture recognition interface system in accordance with an aspect of the invention.

FIG. 8 illustrates another example of a gesture recognition interface system 400 in accordance with an aspect of the invention. The gesture recognition interface system 400 can be another type example of a gesture recognition interface system in which compound gestures can be determined and translated into device inputs, similar to as described above in the example of FIG. 1.

The gesture recognition interface system 400 includes a first camera 402 and a second camera 404. Coupled to each of the first camera 402 and the second camera 404, respectively, is a first IR light source 406 and a second IR light source 408. The first camera 402 and the second camera 404 may each include an IR filter, such that the respective camera may pass IR light and substantially filter other light spectrums. The first IR light source 406 and the second IR light source 408 each illuminate a background surface 410 which can be retroreflective. As such, IR light from the first IR light source 406 can be reflected substantially directly back to the first camera 402 and IR light from the second IR light source 408 can be reflected substantially directly back to the second camera 404. Accordingly, an object that is placed above the background surface 410 may reflect a significantly lesser amount of IR light back to each of the first camera 402 and the second camera 404, respectively. Therefore, such an object can appear to each of the first camera 402 and the second camera 404 as a silhouette image, such that it can appear as a substantially darker object in the foreground of a highly illuminated background surface 410. It is to be understood that the background surface 410 may not be completely retroreflective, but may include a Lambertian factor to facilitate viewing by users at various angles relative to the background surface 410.

An input object 412 can provide simulated inputs over the background surface 410. In the example of FIG. 8, the input object 412 is demonstrated as a user's hand, such that the simulated inputs can be provided through compound gestures, such as described herein in the examples of FIGS. 2-7. It is to be understood that the use of a hand to provide simulated inputs via compound gestures is but one example implementation of the gesture recognition interface system 400. Examples of other types of input objects could include a stylus, wand, pointing stick, or any of a variety of devices that could provide gestures to simulate inputs. It is to be further understood that the input object 412 can be sensorless, in that it need not be specially designed or suited for use in the gesture recognition interface system 400. As one example, a user's naked hand could be used as the input object. As another example, a user could wear a glove that includes retroreflective material or one or more position sensors on knuckles and/or fingertips to provide gesture inputs to the gesture recognition interface system 400 in accordance with an aspect of the invention.

In the example of FIG. 8, the first camera 402 and the second camera 404 each receive separate silhouette images of the input object 412, where each of the separate silhouette images received, respectively, by the first camera 402 and the second camera 404 are a matched pair. For example, each of the first camera 402 and the second camera 404 could rapidly take still photograph images at, for example, sixty times per second, such that each still photograph image taken by the first camera 402 is matched to a still photograph image taken by the second camera 404 at substantially the same time. The input object can appear to be in a different location relative to the retroreflective screen in each silhouette image matched pair captured by each of the first camera 402 and the second camera 404, respectively, due to parallax caused by the different mounted locations of each of the first camera 402 and the second camera 404.

The first camera 402 and the second camera 404 can each provide their respective separate silhouette images of the input object 412 to a controller 414. The controller 414 could reside, for example, within a computer (not shown) for which the gesture recognition interface system 400 is designed to provide a gesture recognition interface. It is to be understood, however, that the hosting of a controller is not limited to a standalone computer, but could be included in embedded processors. The controller 414 can process the respective silhouette images associated with the input object 412 to generate three-dimensional location data associated with the input object 412.

For example, each of the first camera 402 and the second camera 404 could be mounted at a pre-determined angle relative to the background surface 410. For a given matched pair of images of the input object 412, if the predetermined angle of each of the cameras 402 and 404 is equal, then each point of the input object 412 in two-dimensional space in a given image from the camera 402 is equidistant from a corresponding point of the input object 412 in the respective matched image from the camera 404. As such, the controller 414 could determine the three-dimensional physical location of the input object 412 based on a relative parallax separation of the matched pair of images of the input object 412 at a given time. In addition, using a computer algorithm, the controller 414 could also determine the three-dimensional physical location of at least one end-point, such as a fingertip, associated with the input object 412.

The gesture recognition interface system 400 can also include a projector 416 configured to project image data. The projector 416 can provide an output interface, such as, for example, computer monitor data, for which the user can interact and provide inputs using the input object 412. In the example of FIG. 8, the projector 416 can project the image data onto the background surface 410. Because the IR light sources 406 and 408 do not illuminate visible light, the IR illumination does not interfere with the image data projected from the projector 416. The user can thus employ the input object 412 directly onto the image data to simulate inputs, such as, for example, mouse inputs.

It is to be understood that the gesture recognition interface system 400 is not intended to be limited to the example of FIG. 8. As an example, instead of the IR light sources 406 and 408, the projector 416 can include an IR filter as one of the colors on an associated color wheel, such as for a digital light projection (DLP) type projector. As another example, instead of the background surface 410 being retroreflective, the background surface 410 could instead be light diffusive, such that the IR light sources 406 and 408 are configured beneath the background surface 410. As a result, the first and second cameras 402 and 404 detect the IR brightness contrast as shadows of the input object 412 relative to the IR diffuse background surface 410. Accordingly, the gesture recognition interface system 400 can be configured in any of a variety of ways.

Figure 9:
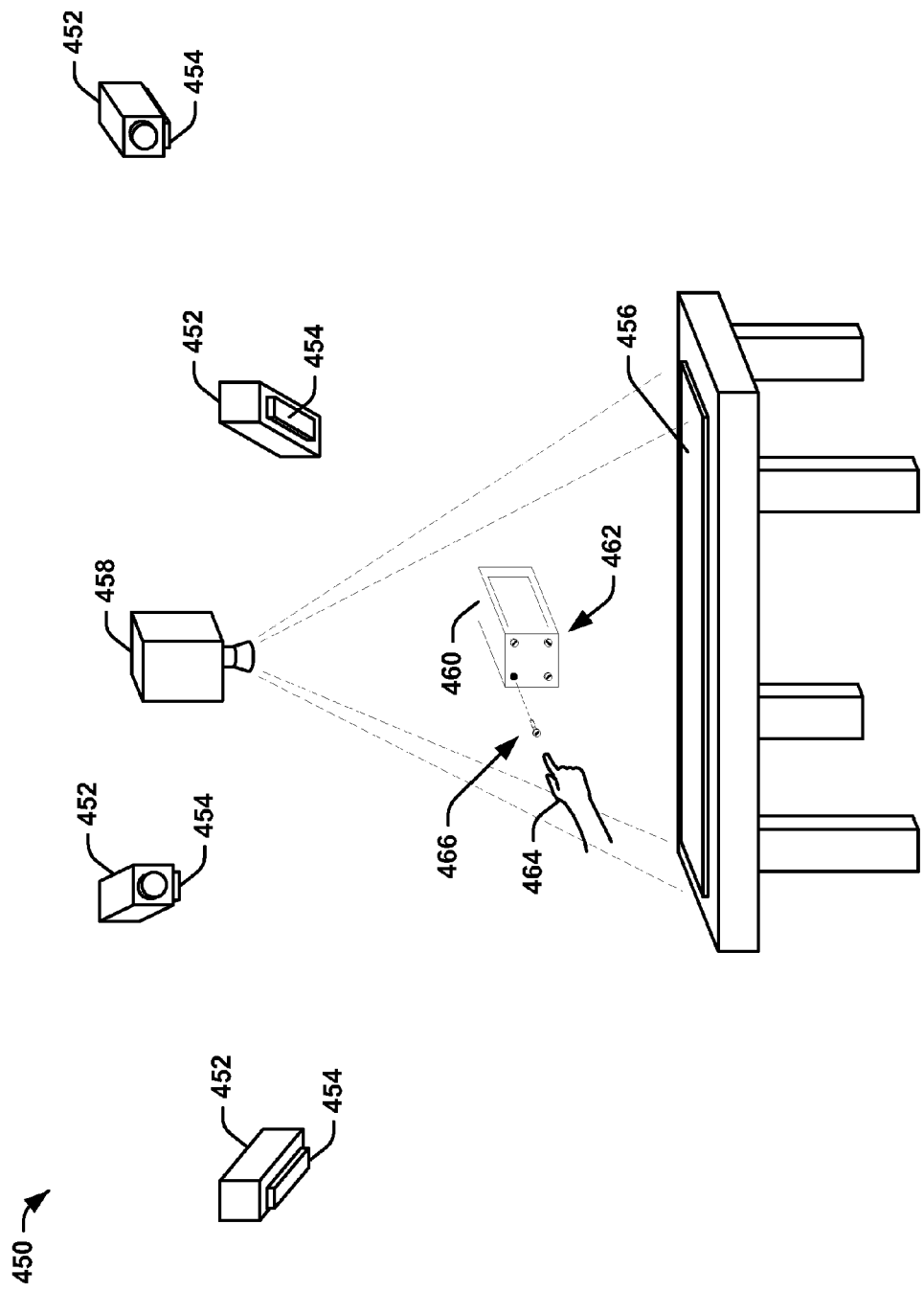
FIG. 9 illustrates yet another example of a gesture recognition interface system in accordance with an aspect of the invention.

FIG. 9 illustrates yet another example of a gesture recognition interface system 450 in accordance with an aspect of the invention. The gesture recognition interface system 450 includes four cameras 452, each of which includes a respective IR light source 454. The cameras 452 may each include an IR filter, such that each of the respective cameras 452 may only be able to receive IR light. The IR light sources 454 each illuminate a retroreflective surface 456, such that IR light from the IR light sources 454 is reflected substantially directly back to the respective one of the cameras 452.

The gesture recognition interface system 450 includes a three-dimensional display system 458, demonstrated in the example of FIG. 9 as a holograph projector. In the example of FIG. 9, the three-dimensional display system 458 projects a holographic image of a simulated object 460. The three-dimensional display system 458 is demonstrated in the example of FIG. 9 as being mounted directly above the retroreflective surface 456. Accordingly, a user can provide compound gestures, such as described above in the examples of FIGS. 2-7, to interact directly with the holographic image of the simulated object 460. In addition, the holographic image of the simulated object 460 can include a plurality of functional components 462, demonstrated in the example of FIG. 9 as screws attached to an end of the simulated object 460.

An input object 464, demonstrated as a user's hand in the example of FIG. 9, can be used to provide compound gestures over the retroreflective surface 456. To provide the interaction between the input object 464 and the given functional component 462, an associated controller (not shown) can detect a three-dimensional physical location of one or more features of the input object 464. For example, the controller could determine the three-dimensional physical location of the features of the input object 464, similar to as described above in the example of FIG. 8. Upon determining a correlation of the physical locations of the input object 464 and a given functional component 462, the controller can determine a gesture motion associated with the input object to determine if it corresponds with a predefined action associated with the functional component. Upon determining that the input gesture corresponds with the predefined action, the simulation application controller can command the three-dimensional display system 458 to output the appropriate simulated action.

As an example, a user of the gesture recognition interface system 450 could perform a reference gesture with the input object 464 to refer to one of the functional components 462, demonstrated in the example of FIG. 9 as a screw 466. The controller can translate the reference gesture into a reference that refers to the screw 466, such as by changing its color as displayed by the three-dimensional display system 458. The user could then perform an execution gesture to execute a command associated with unscrewing the screw 466. For example, the execution gesture could be substantially similar to the execution gestures 210 and 212 of the compound gesture 202 in the example of FIG. 5. As such, the screw 466 can be selected by the execution gesture 210 and rotated (i.e., unscrewed) by the execution gesture 212. Thus, as the user provides the appropriate execution gesture, the controller commands the three-dimensional display system 458 to output the appropriate simulated action, which in the example of FIG. 9, is the screw 466 being unscrewed and removed from the simulated object 460.

The gesture recognition interface system 450 is demonstrated as yet another example of the use of compound gestures in providing device inputs to a computer. It is to be understood that the gesture recognition interface system 450 is not intended to be limited to the example of FIG. 8. As an example, the three-dimensional display system 458 can be configured in a variety of different ways, such as a three-dimensional display screen. As another example, the cameras 452 and IR light sources 454 can be arranged in any of a variety of ways and numbers for the controller to determine the compound gestures that are performed by the user. Accordingly, the gesture recognition interface system 450 can be configured in any of a variety of ways.

Figure 10:
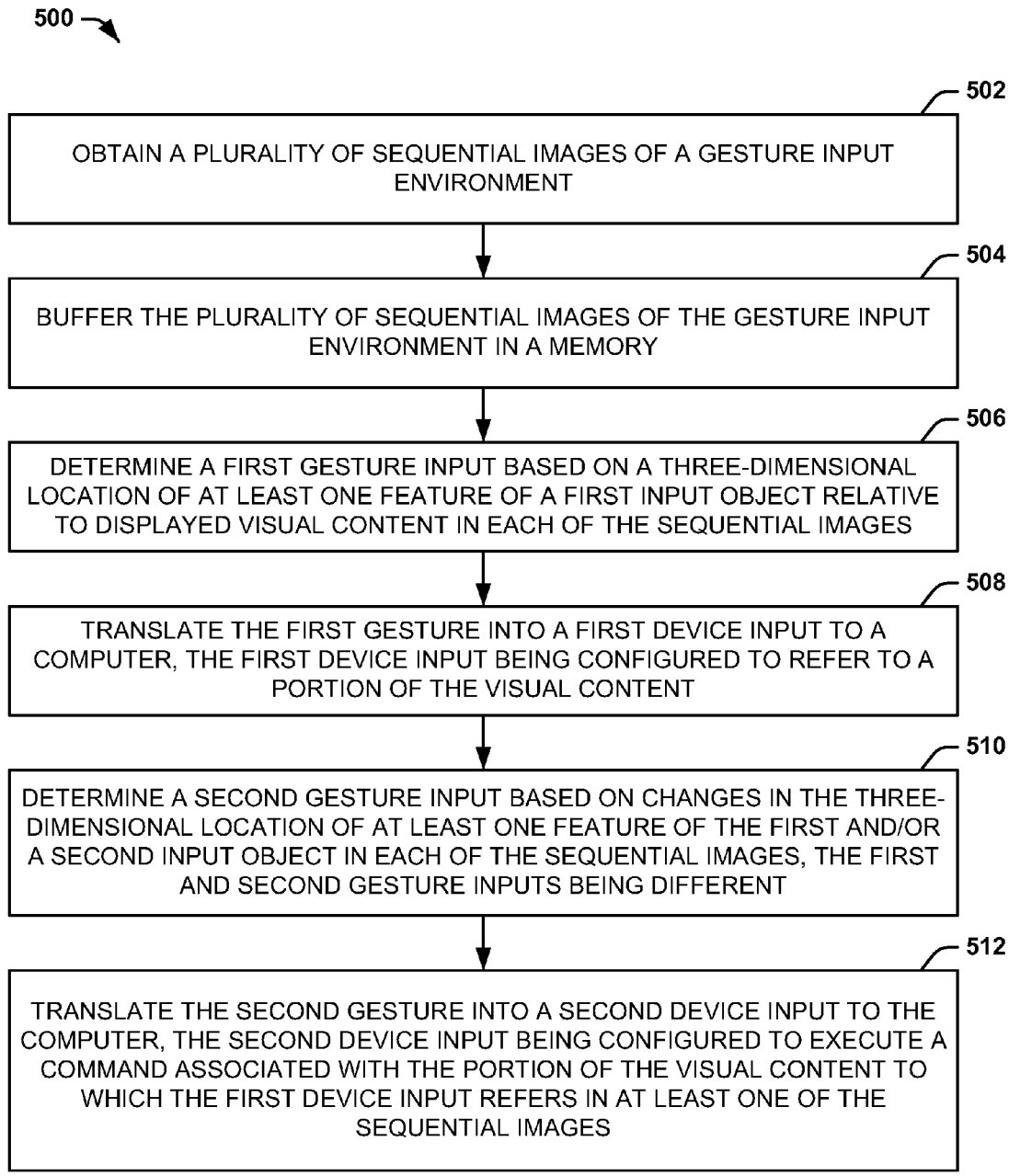
FIG. 10 illustrates an example of a method for providing gesture inputs to a computer in accordance with an aspect of the invention.

In view of the foregoing structural and functional features described above, a methodology in accordance with various aspects of the present invention will be better appreciated with reference to FIG. 10. While, for purposes of simplicity of explanation, the methodologies of FIG. 10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates an example of a method 500 for providing gesture inputs to a computer in accordance with an aspect of the invention. At 502, a plurality of sequential images of a gesture input environment are obtained. The images can be obtained based on stereo cameras that each obtain images concurrently in the sequence. The gesture recognition environment can be defined as a physical volume of free-space in which gestures can be performed by a user, such as in a foreground of a display surface or display environment. At 504, the plurality of sequential images of the gesture input environment are buffered in a memory. The buffering of the sequential images can be based on a queue, such that newer images overwrite older images.

At 506, a first gesture input is determined based on a three-dimensional location of at least one feature of a first input object relative to displayed visual content in each of the plurality of sequential images of the gesture input environment. The first gesture input can be a portion of a compound gesture, such that it is a reference gesture. The gesture can be determined based on an IR brightness contrast as perceived by a controller in each of the sequential images. The three-dimensional location can be based on parallax separation of the features in each of the concurrent images in the sequence. At 508, the first gesture is translated into a first device input to the computer, the first device input being configured to refer to a portion of the visual content. The reference to the portion of the visual content can be based on establishing a reference, such as a mouse pointer, on the visual content in response to the first gesture. Thus the first gesture input could be a pointed index finger to simulate a mouse cursor.

At 510, a second gesture input is determined based on changes in the three-dimensional location of at least one feature of at least one of the first input object and a second input object in each of the plurality of sequential images of the gesture input environment, the second gesture being different than the first gesture. The second gesture input can be a portion of a compound gesture, such that it is an execution gesture. The second gesture input could be performed with the same hand as the first gesture input, the other hand, or with both hands. At 512, the second gesture is translated into a second device input to the computer, the second device input being configured to execute a command associated with the portion of the visual content to which the first device input refers in at least one of the buffered plurality of sequential images. The executed command can be any of a variety of commands that manipulate the portion of the visual content to which the first gesture input refers, such as left, right, or scrolling mouse commands, and/or such as single-click, double-click, or click-and-hold commands.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for executing and interpreting gesture inputs in a gesture recognition interface system, the method comprising:

detecting and translating a first sub-gesture provided by a first hand of a user in a three-dimensional gesture recognition environment into a first device input that defines a given reference associated with a portion of displayed visual content;

detecting and translating a second sub-gesture provided by a second hand of a user while concurrently maintaining the first sub-gesture with the first hand of the user in the three-dimensional gesture recognition environment into a second device input that defines an execution command for the portion of the displayed visual content to which the given reference refers; and detecting and translating a third sub-gesture into a third device input that is configured to execute a command associated with manipulation of the portion of the displayed visual content to which the given reference refers while at least one of the first and second sub-gestures is maintained.

2. The method of claim 1, further comprising maintaining the second sub-gesture to interact with the portion of the displayed visual content.

3. The method of claim 1, wherein the first sub-gesture corresponds to pointing at the portion of the displayed visual content, and wherein the reference corresponds to a mouse cursor.

4. The method of claim 1, wherein the second device input corresponds to one of a double mouse-click and a mouse-click-and-hold.

5. The method of claim 1, wherein translating the first and second sub-gestures comprises:

obtaining a plurality of sequential images of a first bare hand and a second bare hand of a user;

determining a three-dimensional location of each bare hand in each of the plurality of sequential images of the respective bare hands;

determining motion of each bare hand based on changes in the three-dimensional location of the respective bare hands in each of the plurality of sequential images of the each respective bare hand; and correlating the motion of each bare hand into one of a plurality of predefined gestures that each has an associated device input.

6. The method of claim 5, wherein translating the first sub-gesture further comprises:

buffering the plurality of sequential images in a memory;

accessing the buffered plurality of sequential images from the memory subsequent to translating the second gesture; and determining to what the given reference refers on the displayed visual content based on the accessed plurality of sequential images.

7. The method of claim 5, wherein obtaining the plurality of sequential images of each bare hand comprises obtaining a plurality of sequential images of each bare hand concurrently from a plurality of stereo cameras, and wherein determining the three-dimensional location of each bare hand comprises:

illuminating each bare hand with infrared (IR) light;

determining a location of each bare hand in each the plurality of sequential images of each of the plurality of stereo cameras based on an IR brightness contrast between each bare hand and a background; and determining the three-dimensional location of each bare hand based on a parallax separation of each bare hand in each of the concurrently obtained sequential images of each of the respective plurality of stereo cameras.

8. A gesture recognition interface system comprising:

means for displaying visual content;

means for obtaining a plurality of sequential images of a gesture input environment that is associated with the visual content;

means for buffering the plurality of sequential images of the gesture input environment;

means for determining compound gesture inputs including a first input gesture and a second input gesture associated with at least one input object based on three-dimensional locations of at least one feature of the at least one input object in each of the plurality of sequential images of the gesture input environment; and means for translating the compound gesture inputs into a first device input based on the first input gesture and a second device input based on the second input gesture, the first device input being configured to reference a portion of the visual content and the second device input being configured to execute at least one command that allows a user to interact with the selected portion of the displayed visual content using the first input gesture while the second input gesture is maintained, the means for translating determining the reference to the portion of the visual content based on accessing the buffered plurality of sequential images subsequent to translating the second input gesture.

9. The system of claim 8, wherein the means for obtaining the plurality of images comprises plural means for concurrently obtaining the plurality of sequential images from different perspectives, and wherein the means for determining the compound gesture inputs comprises:

means for illuminating the at least one input object with infrared (IR) light; and means for determining the three-dimensional locations of the at least one feature of the at least one input object based on an IR brightness contrast between the at least one input object and a background, and based on a parallax separation of the at least one feature of the at least one input object in the different perspectives of the concurrently obtained plurality of sequential images.

* * * * *